United States Patent [19]
Kando et al.

[11] Patent Number: 4,652,088
[45] Date of Patent: Mar. 24, 1987

[54] LIQUID CRYSTAL DISPLAY DEVICE

[75] Inventors: Yasuhiko Kando; Tamihito Nakagomi; Shinji Hasegawa, all of Mobara, Japan

[73] Assignee: Hitachi, Ltd., Tokyo, Japan

[21] Appl. No.: 695,942

[22] Filed: Jan. 29, 1985

[30] Foreign Application Priority Data

Feb. 1, 1984 [JP] Japan ................................ 59-15112
Feb. 1, 1984 [JP] Japan ................................ 59-15113

[51] Int. Cl.⁴ ............................................. G02F 1/137
[52] U.S. Cl. .................................................. 350/334
[58] Field of Search ................................ 350/334, 337

[56] References Cited

U.S. PATENT DOCUMENTS 3,947,185  3/1976  Maezawa ........................... 350/334
4,039,252  8/1977  Mizuno et al. ..................... 350/334
4,239,345  12/1980  Berreman et al. .............. 350/334 X

FOREIGN PATENT DOCUMENTS 122443  10/1978  Japan .................................. 350/337
25751   2/1979   Japan .................................. 350/337
118016  10/1980  Japan .................................. 350/337

OTHER PUBLICATIONS

Journal of Applied Physics, Apr. 1977, vol. 48, No. 4, pp. 1426–1431.

Primary Examiner—Donald A. Griffin
Attorney, Agent, or Firm—Charles E. Pfund

[57] ABSTRACT

A liquid crystal display device wherein a nematic liquid crystal having a positive dielectric anisotropy and added with a chiral material is sealed between a pair of upper and lower substrates so as to constitute a helical structure twisted within a range between 90° and 160° along a direction of thickness thereof, polarizing axes or absorption axes of a pair of polarizing plates disposed on the upper and lower substrates are inclined by a predetermined angle falling within a range between 25° and 65° with respect to major axes of liquid crystal molecules adjacent to the upper and lower substrates, respectively, and in the direction of the twist of the liquid crystal, and a product $\Delta n \cdot d$ of a thickness d ($\mu$m) and an optical anisotropy $\Delta n$ of a liquid crystal layer falls within a range from 0.8 $\mu$m to 1.2 $\mu$m.

6 Claims, 10 Drawing Figures

LIQUID CRYSTAL DISPLAY DEVICE

BACKGROUND OF THE INVENTION

The present invention relates to a liquid crystal display device and, more particularly, to an improvement in a field effect liquid crystal display device for time-multiplexed driving.

A conventional so-called twisted nematic liquid crystal display device has a 90° twisted helical structure of a nematic liquid crystal having positive dielectric anisotropy and sealed between two substrates having transparent electrodes arranged thereon in desired display patterns. Polarizing plates are arranged on outer surfaces of the substrates such that polarizing axes thereof become perpendicular or parallel to the major axes of the liquid crystal molecules adjacent to the substrates.

In order to twist the liquid crystal molecules between the two substrates through 90°, for example, a so-called rubbing method is utilized to rub and make numerous fine grooves in a surface of a substrate which contacts the liquid crystal molecules by a cloth along one direction. In this case, the major axes of the liquid crystal molecules adjacent to the surface become parallel to this one direction (i.e., a rubbing direction. Two rubbed surfaces are spaced apart so as to oppose each other while their rubbing directions are twisted through 90°. These rubbed substrates are then sealed with a sealing agent, and a nematic liquid crystal having positive dielectric anisotropy is filled in a space formed between the substrates. Therefore, the major axes of the liquid crystal molecules are twisted through 90° between the substrates. The resultant liquid crystal cell is sandwiched between a pair of polarizing plates with their polarizing axes substantially parallel or perpendicular to the major axes of liquid cystal molecules adjacent thereto, respectively. In a conventional reflective type liquid crystal display device which is most frequently used, a reflector is disposed on the outer surface of the lower polarizing plate. Light incident from the upper surface of the device is linearly polarized by the polarizing plate or polarizer. In a portion of a liquid crystal layer which is not applied with a voltage, the plane of polarization of the linearly polarized light is rotated through 90° along the helical structure and is transmitted through the lower polarizing plate. The light is then reflected by the reflector and returns to the upper surface of the device. However, in a portion of the liquid crystal layer which is applied with a voltage, where the helical structure is destroyed, the plane of polarization of the linearly polarized light will not be rotated. Therefore, the linearly polarized light transmitted through the upper polarizing plate is blocked by the lower polarizing plate and will not reach the reflector. In this manner, electrical signals can be converted into optical images in accordance with the presence or absence of an electrical potential applied across the liquid crystal layer.

Performance parameters for a quantification of time-multiplexed driving in a subsequent description will be briefly described below.

FIG. 1 is a graph showing typical luminance-voltage characteristics of a conventional reflective type liquid crystal display device when its polarizing axes are crossed. The graph shows the relative luminance of reflected light as a function of the applied voltage. An initial value of luminance is 100%, and the final value when no or little further change in reflection occurs is 0%. In general, a threshold voltage Vth is given at a 90% relative luminance, and a saturation voltage Vsat is given at a 10% relative luminance so as to determine the liquid crystal characteristics. However, in practice, a pixel is sufficiently bright when the relative luminance is more than 90%, so that the pixel is considered to be in an OFF state. When the relative luminance is less than 50%, the pixel is sufficiently dark, and hence the pixel is considered to be in an ON state. Voltages corresponding to 90% and 50% of relative luminances are given as the threshold voltage Vth and the saturation voltage Vsat, respectively, hereinafter. In other words, the threshold voltage Vth is given as a maximum allowable voltage corresponding to the OFF state, and the saturation voltage Vsat is given as a minimum allowable voltage corresponding to the ON state. For a transmissive type liquid crystal display device, FIG. 1 represents transmission-voltage characteristics.

The electrooptical characteristics of the liquid crystal display device change in accordance with a viewing angle. These characteristics limit a viewing angle range within which a good display quality is obtained.

A viewing angle $\phi$ will be described with reference to FIG. 2. Referring to FIG. 2, a rubbing direction of an upper substrate 11 of a liquid crystal display device 1 is represented by reference numeral 2, a rubbing direction of a lower substrate 12 is represented by reference numeral 3, and a twist angle between liquid crystal molecules adjacent to the upper substrate and liquid crystal molecules adjacent to the lower substrate is represented by reference numeral 4. X- and Y-axes are plotted along the surface of the liquid crystal display device 1. The X-axis defines a direction for bisecting the twist angle 4 of the liquid crystal molecules. A Z-axis defines a normal to the X-Y plane. An angle between a viewing direction 5 and the Z-axis is defined as the viewing angle $\phi$. In this case, by way of simplicity, the viewing direction 5 is plotted in the X-Z plane. The viewing angle $\phi$ in FIG. 2 is regarded to be positive. Since contrast becomes high when viewed from a direction within the X-Z plane, this direction is called the viewing direction 5.

Conventional commercially available liquid crystal display devices have viewing angles falling within a range of 10° to 40°. Therefore, referring to FIG. 1, when a voltage corresponding to the 90% luminance at the viewing angle $\phi$ of 10° is represented as a threshold voltage Vth1, the voltage corresponding to the 50% luminance at the same viewing angle is represented as a saturation voltage Vsat1, and a voltage corresponding to the 90% luminance at a viewing angle of 40° is represented by a threshold voltage Vth2, the sharpness of the luminance-voltage characteristic $\gamma$, the viewing-angle dependence $\Delta\phi$, and the time-multiplexability m, are defined as follows:

$\gamma =$ Vsat1/Vth1
$\Delta\phi =$ Vth2/Vth1
m = Vth2/Vsat1

Assuming luminance-voltage characteristic curves are ideal, the two curves at viewing angles $\phi$ of 10° and 40° do not differ, the curves are steep enough for a threshold voltage and a saturation voltage to have the same value.

The time-multiplexed driving characteristics of the conventional liquid crystal display device depend on $\Delta n \cdot d$ where $\Delta n$ is the refractive index anisotropy, i.e., optical anisotropy of the liquid crystal and d is the thickness of the liquid crystal layer. When $\Delta n \cdot d$ is large (e.g., more than 0.8 μm), the sharpness of the luminance-voltage characteristic $\gamma$ becomes good (small), and the viewing-angle dependence $\Delta\phi$ is poor (small). However, when $\Delta n \cdot d$ is small (e.g., less than 0.8 μm), the sharpness of the luminance-voltage characteristic $\gamma$ becomes poor (large) and the viewing-angle dependence $\Delta\phi$ becomes good (large). However, the time-multiplexability m ($=\Delta\phi/\gamma$) becomes good (large) when $\Delta n \cdot d$ is decreased. A typical example is summarized in Table 1.

TABLE 1

| Characteristics | $\Delta n \cdot d$ | |
|---|---|---|
| | 0.5 μm | 1.0 μm |
| $\gamma$ | 1.150 | 1.084 |
| $\Delta\phi$ | 0.965 | 0.877 |
| m | 0.839 | 0.808 |

Time-multiplexed driving will be briefly described with reference to a dot matrix display. As shown in FIG. 3, Y stripe electrodes (signal electrodes) 13 and X stripe electrodes (scanning electrodes) 14 are formed on the lower and upper substrates 12 and 11, respectively. Pixels, liquid crystal portions at intersections of the X and Y electrodes 14 and 13 are chosen to be in an ON state or an OFF state so as to display characters or the like. Referring to FIG. 3, n scanning electrodes X1, X2, ..., Xn are repeatedly scanned in the order named in a time-multiplexed manner. When a given scanning electrode (e.g., X3 in FIG. 3) is selected, a selection or nonselection display signal is simultaneously applied to all pixels P31, P32, ... and P3m on the given scanning electrode through the signal electrode 13 constituted by electrodes Y1, Y2, ... and Ym in accordance with a display signal. In other words, the on/off operation of the pixels at the intersections of the scanning electrodes and the signal electrodes is determined by a combination of voltage pulses applied to the scanning and signal electrodes. In this case, the number of scanning electrodes X corresponds to the number of time-multiplexing.

The conventional liquid crystal display device has poor time-multiplexed drive characteristics as shown in Table 1, and these characteristics would permit time-multiplexing of only a maximum of 32 or 64. However, demand has arisen to improve the image quality of the liquid crystal display device and increase the number of data to be displayed. Any conventional liquid crystal display device cannot satisfy these needs.

Under these circumstances, the present inventors developed a liquid crystal display device having improved time-multiplexed drive characteristics as described in copending U.S. patent application Ser. No. 644,766 assigned to the same assignee, entitled "Liquid Crystal Display Device" and filed on Aug. 27, 1984. In this liquid crystal display device having a twist angle range of 160° to 200° in the helical structure of nematic liquid crystal molecules, polarizing axes or absorption axes of a pair of polarizing plates disposed to sandwich the helical structure are shifted by a predetermined angle with respect to orientation of the substrates adjacent to the polarizing plates. The time-multiplexing drive characteristics of this liquid crystal display device are better than those of the above-described conventional liquid crystal device, thereby providing a good liquid crystal display device capable of displaying images of excellent quality with time-multiplexing of more than 32. However, no description is made on a device in a range outside the above-mentioned twist angle range.

SUMMARY OF THE INVENTION

It is, therefore, an object of the present invention to provide a liquid crystal display device having a cell structure entirely different from that of the conventional liquid crystal display device and a twist angle range different from that of 160°–200° of a conventional helical structure of nematic liquid crystal molecules, thereby providing excellent time-multiplexed drive characteristics and hence excellent image quality even if the number of time-multiplexing is more than 32.

According to one aspect of the present invention, there is provided a liquid crystal display device wherein a nematic liquid crystal having a positive dielectric anisotropy and added with a chiral material is sealed between a pair of upper and lower substrates so as to constitute a helical structure twisted within a range between 90° and 160° along a direction of thickness thereof, polarizing axes or absorption axes of a pair of polarizing plates disposed on the upper and lower substrates are inclined by a predetermined angle, respectively, falling within a range between 25° and 65° with respect to major axes of liquid crystal molecules adjacent to the upper and lower substrates, respectively, and in the direction of the twist, and a product $\Delta n \cdot d$ of a thickness d (μm) and an optical anisotropy $\Delta n$ of a liquid crystal layer falls within a range from 0.8 μm to 1.2 μm.

According to another aspect of the present invention, there is provided a liquid crystal display device wherein a nematic liquid crystal having a positive dielectric anisotropy and added with a chiral material is sealed between a pair of upper and lower substrates so as to constitute a helical structure twisted within a range between 90° and 160° along a direction of thickness thereof, one of polarizing axes or absorption axes of a pair of polarizing plates disposed on the upper and lower substrates is inclined by a predetermined angle falling within a range between 25° and 65° with respect to major axes of liquid crystal molecules adjacent to a corresponding one of the upper and lower substrates, respectively, and in the direction of the above twist and the other of the polarizing axes or absorption axes of the pair of polarizing plates is inclined by a predetermined angle falling within a range between 25° and 65° with respect to major axes of the liquid crystal molecules adjacent to the corresponding one of the upper and lower substrates and in a direction opposite to the above twist direction, and a product $\Delta n \cdot d$ of a thickness d (μm) and an optical anisotropy $\Delta n$ of a liquid crystal layer falls within a range from 0.55 to 0.90 μm.

DESCRIPTION OF THE PREFERRED EMBODIMENTS

Preferred embodiments of the present invention will be described with reference to the accompanying drawings.

Figure 1:
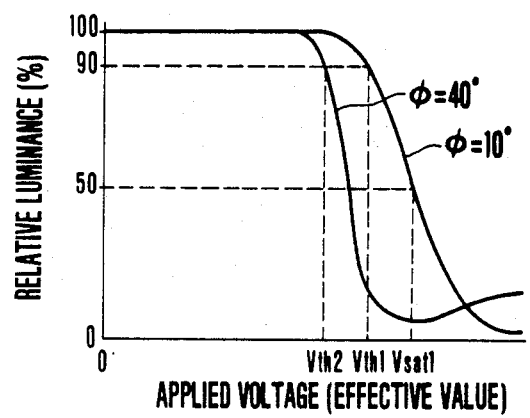
FIG. 1 is a graph showing the luminance-voltage characteristics of a conventional liquid crystal display device used in defining time-multiplexed characteristics.
Figure 2:
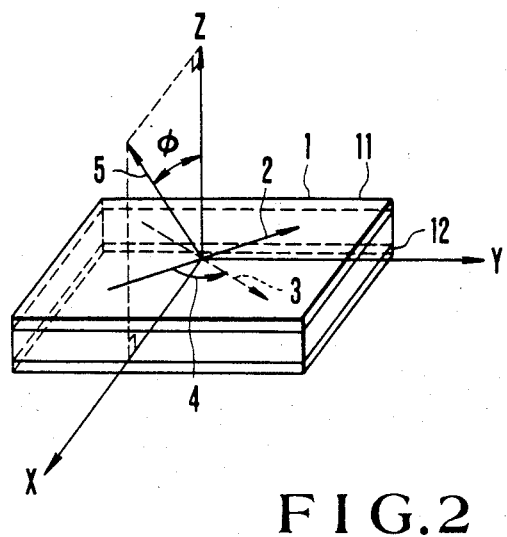
FIG. 2 is a perspective view of the liquid crystal display device for explaining the measuring direction of the time-multiplexed drive characteristics.
Figure 3:
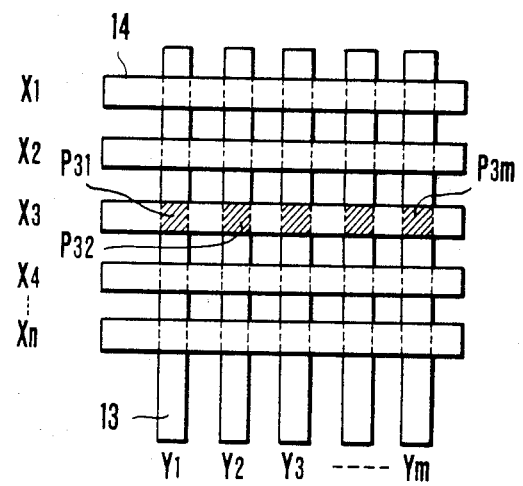
FIG. 3 is a representation for explaining time-multiplexed driving.
Figures 4, 5:
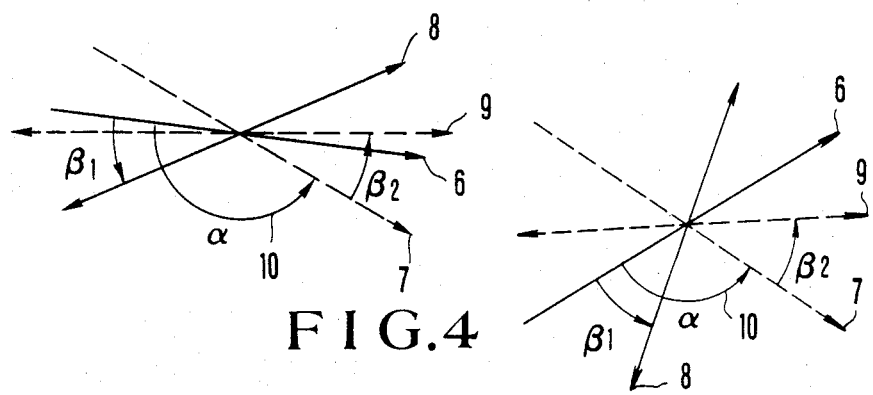
FIGS. 4, 5, 6 and 7 are representations for explaining the relationship between the aligning direction of liquid crystal molecules, the twist direction, and the axes of polarizers of a liquid crystal display device according to an embodiment of the present invention, respectively.
Figure 7:
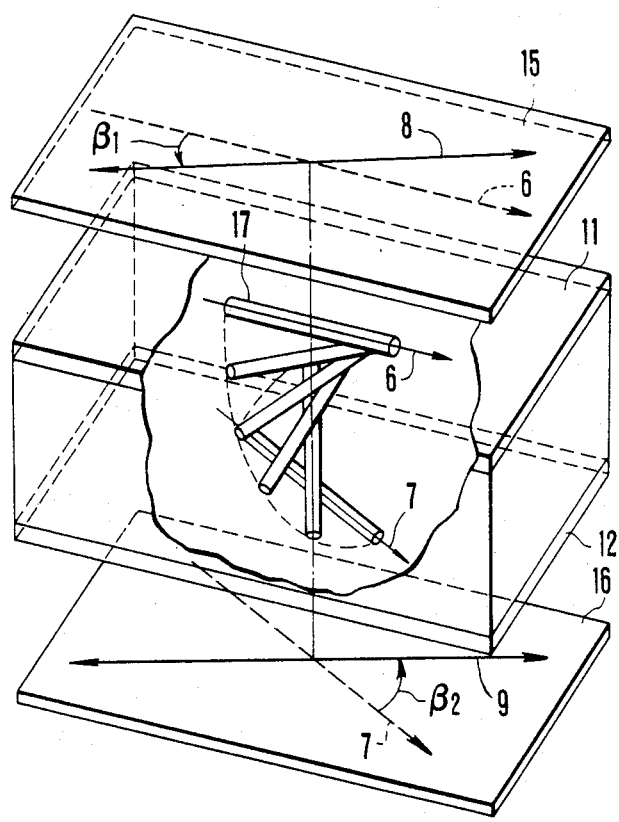

FIG. 4 shows the relationship between the direction (equivalent to, e.g., a rubbing direction) of major axes of the liquid crystal molecules, a twist angle thereof, and absorption axes (or polarizing axes) of the polarizers of a liquid crystal display device according to an embodiment of the present invention when the liquid crystal display device is viewed from the upper direction. FIG. 7 is a perspective view showing this relationship. The same reference numerals as in FIG. 2 denote the same parts as in FIG. 7. In this case, liquid crystal molecules 17 are twisted through an angle $\alpha$ counterclockwise from a rubbing direction 6 of an upper substrate 11 to a rubbing direction 7 of a lower substrate 12. An angle $\beta 1$ between the rubbing direction 6 of the upper substrate 11 and an absorption axis (or polarizing axis) 8 of the upper polarizing plate 15 has the same direction as a twist direction 10 (counterclockwise in this case) of the liquid crystal molecules with respect to the rubbing direction 6 of the upper substrate 11. An angle $\beta 2$ between the rubbing direction 7 of the lower substrate 12 and an absorption axis (or polarizing axis) 9 of the lower polarizing plate 16 is defined in the same manner as the angle $\beta 1$. When an angle of an integer multiple of 180° is added to the angle $\beta 1$ or $\beta 2$, a value of the resultant angle is naturally the same as that of the angle $\beta 1$ or $\beta 2$. The values of the angles $\beta 1$ and $\beta 2$ are represented by minimum values among the angles having the same values. In addition, the twist direction 10 (indicated by a curved arrow) and the twist angle $\alpha$ of the liquid crystal molecules 17 are determined by the rubbing direction 6 of the upper substrate 11, the rubbing direction 7 of the lower substrate 12, and the type and an amount of a chiral material added to a nematic liquid crystal. In particular, the twist direction is determined by the type and an amount of chiral material. The twist angle is determined by the rubbing directions 6 and 7 of the upper and lower substrates 11 and 12. The stability of orientation of the liquid crystal molecules is determined by a specific pitch of the chiral material, an amount thereof, and a thickness of the liquid crystal layer.

A maximum value of the twist angle $\alpha$ is limited to 160° because light scattering tends to occur when the liquid crystal display device is in an ON state at or near the threshold voltage. The lower limit of the twist angle is determined to be 90° because at twist angles smaller than 90°, color of display varies with viewing angles to an objectionable degree.

The angle $\beta 1$ between the absorption axis (or polarizing axis) 8 of the upper polarizing plate 15 and the rubbing direction 6 of the upper substrate 11 and the angle $\beta 2$ between the absorption axis (or polarizing axis) 9 of the lower polarizing plate 16 and the rubbing direction 7 of the lower substrate 12 must respectively fall within the range between 25° and 65° when contrast, luminance, time-multiplexing drive characteristics, color and the like are considered.

Figure 6:
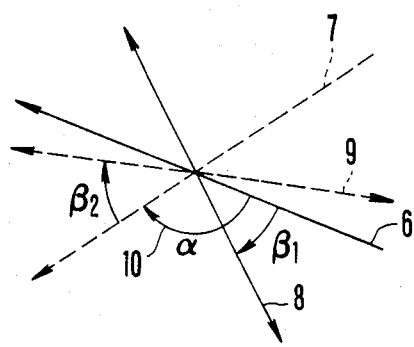

In FIG. 4, assuming that the twist direction 10 of the liquid crystal molecules is counterclockwise, the angles $\beta 1$ and $\beta 2$ are defined. However, even if the twist direction of the liquid crystal molecules is clockwise, as shown in FIG. 6, the same effect as described above can be obtained by defining the angles $\beta 1$ and $\beta 2$ clockwise.

The characteristics of the liquid crystal display device according to the present invention greatly depend on $\Delta n \cdot d$, i.e., an optical path difference, d and $\Delta n$ being a thickness in $\mu m$ and an optical anisotropy of the liquid crystal layer. When the optical path difference satisfies the condition $0.8 \ \mu m \leq \Delta n \cdot d \leq 1.2 \ \mu m$, in terms of contrast, luminance, colors and the like, satisfactory results are obtained. The optical anisotropy $\Delta n$ generally depends on wavelengths. The optical anisotropy is increased when the wavelength is short, while it is decreased when the wavelength becomes long. The optical anisotropy $\Delta n$ value in this specification is measured by using an He-Ne laser beam of a wavelength of 6,328 Å at a temperature of 25° C. When the optical anisotropy is measured at another wavelength, it may be slightly different from that measured in the present invention.

The construction and the measured results of the liquid crystal display device according to an embodiment of the present invention will be described hereinafter.

FIG. 5 shows the relationship between the rubbing direction of the substrates, the twist direction and angle of the helical structure of the liquid crystal molecules, and the polarizing axes (or absorption axes) of the polarizers when the liquid crystal display device is viewed from the upper direction.

A liquid crystal used in this device comprises a nematic liquid crystal. This nematic liquid crystal contains as major constituents a total amount of 79% of a biphenyl liquid crystal and ester cyclohexane (ECH) liquid crystal. The nematic liquid crystal further contains as an additive 0.5% by weight of a chiral material S811

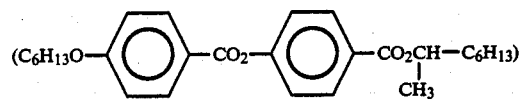

available from Merk. The optical anisotropy $\Delta n$ of this nematic liquid crystal is 0.123, and the compound thereof is given in Table 2.

TABLE 2

| Component | Content (% by weight) |
|---|---|
| $C_4H_9$—⟨H⟩—$CO_2$—⟨◯⟩—$OC_2H_5$ | 21 |
| $C_3H_7$—⟨H⟩—$CO_s$—⟨◯⟩—$OC_2H_5$ | 21 |
| $C_5H_{11}$—⟨H⟩—$CO_2$—⟨◯⟩—$OCH_3$ | 21 |
| $C_2H_5$—⟨◯⟩—⟨◯⟩—CH | 8 |

TABLE 2-continued

| Component | Content (% by weight) |
|---|---|
| $C_4H_9-\bigcirc-\bigcirc-CH$ | 8 |
| $C_2H_5-\bigcirc-CO_2-\bigcirc-CN$ with F | 7.5 |
| $C_3H_7-\bigcirc-\bigcirc-CO_2-\bigcirc-\langle H\rangle-C_3H_7$ | 7 |
| $C_3H_7-\bigcirc-\bigcirc-CO_2-\bigcirc-\langle H\rangle-C_5H_{11}$ | 6 |
| S811 | 0.5 |

Referring to FIG. 5, the angle between the rubbing directions 6 and 7 of the upper and lower substrates 11 and 12 is 140°, the twist direction upon addition of the chiral material S811 is represented by reference numeral 10, and the twist angle $\alpha$ is 140°. The angles $\beta 1$ and $\beta 2$ between the rubbing direction 6 and the absorption axis 8 and between the rubbing direction 7 and the absorption axis 9 are respectively 45°.

A number of liquid crystal devices with various values of thickness d of liquid crystal layers resulting in various values of optical path difference $\Delta n \cdot d$ have been constructed for testing displayed colors and luminance. Test results are shown in Table 3.

TABLE 3

| $\Delta n \cdot d$ ($\mu m$) | Luminance | Color |
|---|---|---|
| 0.70 | dark | purple |
| 0.80 | slightly dark | blue |
| 0.90 | bright | green |
| 1.00 | very bright | yellowish green |
| 1.10 | bright | yellowish orange |
| 1.20 | slightly dark | reddish orange |
| 1.30 | dark | reddish purple |
| 1.40 | dark | bluish green |

It was found that both colors and luminance of the liquid crystal display device were best and satisfactory when the optical path difference $\Delta n \cdot d$ was about 1.00 $\mu m$, i.e., in the range between 0.90 $\mu m$ and 1.10 $\mu m$. In addition, it was also found that no problem occurred in practice when the optical path difference $\Delta n \cdot d$ fell within the range from 0.80 $\mu m$ to 1.20 $\mu m$.

Table 3 shows experimental results when the twist angle $\alpha$ is 140°. However, similar results to those of Table 3 can be obtained with the FIG. 4 arrangement when the twist angle $\alpha$ falls within a range between 90° and 160° and the shift angles $\beta 1$ and $\beta 2$ fall within a range between 25° and 65°, without raising any practical problems for the range of $\Delta n \cdot d$ being 0.8 to 1.20 $\mu m$.

The measured results of the time-multiplexed drive characteristics of the liquid crystal cell having the optical path difference $\Delta n \cdot d$ of 1.05 $\mu m$ are summarized in Table 4 according to the liquid crystal device of the present invention. The sharpness of luminance-voltage characteristic, $\gamma$, the viewing-angle dependence $\Delta \phi$ and the time-multiplexability m are greatly improved.

TABLE 4

| | |
|---|---|
| $\gamma$ | 1.041 |
| $\Delta \phi$ | 0.975 |
| m | 0.937 |

In FIG. 5, the polarizing axes of the polarizing plates can be arranged in place of the absorption axes to obtain the same effect. In the above embodiment, a liquid crystal mixture of biphenyl and ECH liquid crystals is used. However, any other nematic liquid crystal having the positive dielectric anisotropy may be used to obtain the same effect as in the above embodiment. The twist direction of the helical structure is the counterclockwise direction in the above embodiment. However, as shown in FIG. 6, the twist direction may be the clockwise direction to obtain the same effect as in the above embodiment.

The type of chiral material is not particularly limited to the above chiral material when the relationships between the rubbing directions and the twist directions shown in FIGS. 4, 5 and 6 are held.

According to the present invention as described above, unlike the conventional liquid crystal display device, a liquid crystal display device having the excellent time-multiplexed drive characteristics and high quality display characteristics is obtained.

Figure 8:
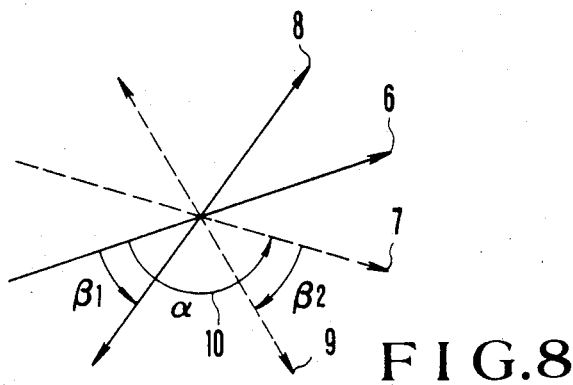
FIGS. 8 to 10 are representations each for explaining the relationship among the major axes of the liquid crystal molecules, the twist angle and the axes of the polarizers of a liquid crystal display device according to other embodiment of the present invention.
Figure 9:
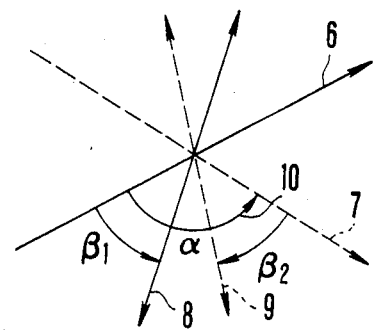
Figure 10:
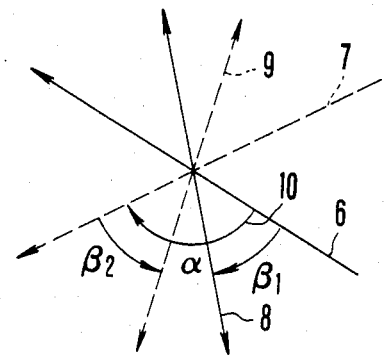

In the above embodiment, the polarizing axes or absorption axes of the upper and lower polarizing plates are inclined in the same direction as the twist angle of the liquid crystal molecules. However, one of the polarizing axes or absorption axes of the upper and lower polarizing plate can be inclined in the same direction as the twist angle of the liquid crystal molecules, and the other thereof can be inclined in a direction opposite to the twist angle. These inclinations are limited within the predetermined angle range. The same good characteristics as in the above embodiment can be obtained. FIGS. 8 to 10 show another embodiment implementing the above alternative.

Referring to FIG. 8, in the same manner as in the the previous embodiment, liquid crystal molecules are twisted through an angle $\alpha$ counterclockwise from as a start direction a rubbing direction 6 of an upper substrate to a rubbing direction 7 of a lower substrate. An angle $\beta 1$ between the rubbing direction 6 of the upper substrate and an absorption axis (or polarizing axis) 8 of the upper polarizing plate has the same direction as a twist direction 10 (counterclockwise in this case) of the liquid crystal molecules with respect to as a start direction the rubbing direction 6 of the upper substrate. However, an angle $\beta 2$ between the rubbing direction 7 of the lower substrate and an absorption axis (or polarizing axis) 9 of the lower polarizing plate has a direction (clockwise) opposite to the twist direction 10 with respect to the rubbing direction 7 as the start direction.

The angle $\beta 1$ between the absorption axis (or polarizing axis) of the upper polarizing plate and the rubbing direction of the upper substrate and the angle $\beta 2$ between the absorption axis (or polarizing axis) 9 of the lower polarizing plate and the rubbing direction 7 of the lower substrate must respectively fall within the range between 25° and 65° when contrast, luminance, time-multiplexing drive characteristics, color and the like are considered.

In FIG. 8, assuming that the twist direction 10 of the liquid crystal molecules is counterclockwise, the angles $\beta 1$ and $\beta 2$ are defined. However, if the twist direction of the liquid crystal molecules is clockwise, as opposed to the embodiment in FIG. 8, as shown in FIG. 10, the same effect as described above can be obtained by defining the angles β1 and β2 clockwise.

In the second embodiment, it was found that good contrast, luminance and colors were obtained when condition 0.55 μm ≦ Δn·d ≦ 0.9 μm was satisfied.

The structure and measurements of the exemplified case of the liquid crystal display device according to the second embodiment of the present invention will be described below. For the same purpose as in FIG. 5, FIG. 9 shows a top view of the liquid crystal display device. The used liquid crystal is the same as in the first embodiment.

Referring to FIG. 9, the angle between the rubbing directions 6 and 7 of the upper and lower substrates is 120°, the twist direction upon addition of the chiral material S811 is represented by reference numeral 10, and the twist angle α is 120°. The angles β1 and β2 between the rubbing direction 6 and the absorption axis 8 and between the rubbing direction 7 and the absorption axis 9 are respectively 45°.

A number of liquid crystal devices with various values of thickness d of liquid crystal layers resulting in various values of optical path difference Δn·d have been constructed for testing displayed colors and luminance. Test results are shown in Table 5.

TABLE 5

| Δn · d (μm) | Luminance | Color |
|---|---|---|
| 0.40 | very dark | dark blue |
| 0.50 | dark | blue |
| 0.55 | slightly dark | bluish green |
| 0.60 | slightly dark | green |
| 0.65 | bright | green |
| 0.70 | bright | yellowish green |
| 0.75 | very bright | yellowish green |
| 0.80 | bright | yellowish orange |
| 0.85 | slightly dark | orange |
| 0.90 | slightly dark | reddish orange |
| 1.00 | dark | purple |

It was found tha both of colors and luminance of the liquid crystal display device were best and satisfactory when the optical path difference Δn·d was about 0.75 μm, i.e., in the range between 0.65 μm and 0.85 μm. In addition, it was also found that no problem occurred in practice when the optical path difference Δn·d fell within the range from 0.55 μm to 0.90 μm.

Table 5 shows experimental results when the twist angle α is 120°. However, similar results to those of Table 5 can be obtained with the FIG. 8 arrangement when the twist angle α falls within a range between 90° and 160° and the shift angles β1 and β2 fall within a range between 25° and 65°, without raising any practical problems for the range of Δn·d being 0.8 to 1.20 μm.

The measurement results of time-multiplexing drive characteristics having the optical path difference Δn·d=0.75 μm are summarized in Table 6. The characteristics γ, Δφ, and m are greatly improved as compared with those (Table 1) of the conventional liquid crystal display devices.

TABLE 6

| | |
|---|---|
| γ | 1.062 |
| Δφ | 0.971 |
| m | 0.914 |

In the second embodiment, the twist direction of the helical structure is the counterclockwise direction. However, as shown in FIG. 10, the twist direction may be the clockwise direction to obtain the same effect as in the second embodiment.

What is claimed is:

1. A liquid crystal display device wherein a nematic liquid crystal having a positive dielectric anisotropy and added with a chiral material is sealed between a pair of upper and lower substrates so as to constitute a helical structure twisted within a range between 90° and 160° along a direction of thickness thereof, polarizing axes or absorption axes of a pair of polarizing plates disposed on said upper and lower substrates are inclined by a predetermined angle, respectively, falling within a range between 25° and 65° with respect to major axes of liquid crystal molecules adjacent to said upper and lower substrates, respectively, and in the direction of the twist of the liquid crystal, and a product Δn·d of a thickness d (μm) and an optical anisotropy Δn of a liquid crystal layer falls within a range from 0.8 μm to 1.2 μm.

2. A device according to claim 1, wherein the optical anisotropy Δn·d falls within a range between 0.90 μm and 1.10 μm.

3. A device according to claim 1, wherein the predetermined angles are 45°, respectively.

4. A liquid crystal display device wherein a nematic liquid crystal having a positive dielectric anisotropy and added with a chiral material is sealed between a pair of upper and lower substrates so as to constitute a helical structure twisted within a range between 90° and 160° along a direction of thickness thereof, one of polarizing axes or absorption axes of a pair of polarizing plates disposed on said upper and lower substrates is inclined by a predetermined angle falling within a range between 25° and 65° with respect to major axes of liquid crystal molecules adjacent to a corresponding one of said upper and lower substrates, respectively, in the direction of the twist of the liquid crystal, and the other of the polarizing axes or absorption axes of said pair of polarizing plates is inclined by a predetermined angle with respect to the major axes and of the liquid crystal molecules adjacent to the corresponding one of said upper and lower substrates and in a direction opposite to the direction of the twist of the liquid crystal, and a product Δn·d of a thickness d (μm) and an optical anisotropy Δn of a liquid crystal layer falls within a range from 0.55 to 0.90 μm.

5. A device according to claim 4, wherein the optical anisotropy Δn·d falls within a range between 0.65 μm and 0.85 μm.

6. A device according to claim 4, wherein the predetermined angles are 45°, respectively.

* * * * *